United States Patent
Lilly (10) Patent No.: US 8,671,683 B2
(45) Date of Patent: Mar. 18, 2014

(54) BUTTERFLY VALVE FOR TURBOCHARGER SYSTEMS

(75) Inventor: Daryl A. Lilly, Winterset, IA (US)

(73) Assignee: Actuant Corporation, Menomonee Falls, WI (US)

( * ) Notice: Subject to any disclaimer, the term of this patent is extended or adjusted under 35 U.S.C. 154(b) by 465 days.

(21) Appl. No.: 13/003,348

(22) PCT Filed: Jul. 9, 2009

(86) PCT No.: PCT/US2009/050076
§ 371 (c)(1),
(2), (4) Date: Jan. 10, 2011

(87) PCT Pub. No.: WO2010/006149
PCT Pub. Date: Jan. 14, 2010

(65) Prior Publication Data
US 2011/0116910 A1    May 19, 2011

Related U.S. Application Data (60) Provisional application No. 61/079,696, filed on Jul. 10, 2008.

(51) Int. Cl.
*F02B 33/44* (2006.01)
(52) U.S. Cl.
USPC ............................... 60/612; 60/600; 251/305
(58) Field of Classification Search
USPC .............................. 60/612, 602, 600; 251/305
See application file for complete search history.

(56) References Cited

U.S. PATENT DOCUMENTS

| | | | |
|---|---|---|---|
| 3,816,693 A | 6/1974 | Braun | |
| 4,424,781 A | 1/1984 | Speer et al. | |
| 4,615,370 A | 10/1986 | Cuccolini | |
| 4,850,322 A * | 7/1989 | Uthoff et al. | 123/399 |
| 4,981,119 A | 1/1991 | Neitz et al. | |
| 5,123,246 A | 6/1992 | Younessi et al. | |
| 5,346,136 A * | 9/1994 | Bassett | 239/533.2 |
| 6,263,672 B1 | 7/2001 | Roby et al. | |
| 6,484,751 B2 | 11/2002 | Lafler et al. | |
| 6,698,717 B1 * | 3/2004 | Brookshire et al. | 251/305 |
| 6,883,320 B2 * | 4/2005 | Tyler | 60/602 |
| 7,201,121 B2 * | 4/2007 | Weber et al. | 123/90.12 |
| 7,263,983 B2 | 9/2007 | Maeda | |

(Continued)

FOREIGN PATENT DOCUMENTS

| | | |
|---|---|---|
| EP | 0747577 A1 | 12/1996 |
| GB | 1299784 | 12/1972 |
| WO | WO2006097884 A1 | 9/2006 |

OTHER PUBLICATIONS

PCT International Search Report and Written Opinion, Application No. PCT/US2009/050065, Sep. 1, 2009.

(Continued)

*Primary Examiner* — Thomas Denion
*Assistant Examiner* — Thomas Olszewski
(74) *Attorney, Agent, or Firm* — Michael Best & Friedrich, LLP (57) ABSTRACT

A butterfly valve for a turbocharger system in which the leak path through the valve is controlled by keeping the clearance between either a shaft of the valve and two bushings small or the clearance between the bushings and the counter bores in the valve element small, and making the other clearance larger.

17 Claims, 7 Drawing Sheets

(56) References Cited

U.S. PATENT DOCUMENTS

| | | | |
|---|---|---|---|
| 7,360,362 B2* | 4/2008 | Nicolle et al. | 60/612 |
| 7,607,302 B2* | 10/2009 | Fry et al. | 60/612 |
| 7,644,585 B2* | 1/2010 | Haugen | 60/612 |
| 7,975,478 B2* | 7/2011 | Zielke et al. | 60/605.2 |
| 2002/0046562 A1 | 4/2002 | Allansson et al. | |
| 2007/0214771 A1* | 9/2007 | Freitag et al. | 60/278 |
| 2008/0034752 A1 | 2/2008 | Becker et al. | |
| 2008/0110435 A1* | 5/2008 | Baasch et al. | 123/399 |

OTHER PUBLICATIONS

PCT International Search Report and Written Opinion, Application No. PCT/US2009/050072, Sep. 1, 2009.

PCT International Search Report and Written Opinion, Application No. PCT/US2009/050078, Oct. 6, 2009.

International Search Report and Written Opinion under date of Sep. 1, 2009 in connection with PCT/US2009/050076.

* cited by examiner

BUTTERFLY VALVE FOR TURBOCHARGER SYSTEMS

CROSS-REFERENCE TO RELATED APPLICATIONS

This application is a national phase application of International Application No. PCT/US2009/050076, filed Jul. 9, 2009, which claims the benefit of U.S. Provisional Patent Application No. 61/079,696 filed Jul. 10, 2008, the disclosure of which is hereby incorporated by reference in their entirety.

STATEMENT CONCERNING FEDERALLY SPONSORED RESEARCH OR DEVELOPMENT

Not applicable.

FIELD OF THE INVENTION

The present invention relates to valves for turbocharger systems, and in particular to such a valve that is a butterfly valve.

BACKGROUND OF THE INVENTION

Turbochargers have become popular for many different types of internal combustion engines, from large diesel engines to small gasoline engines. The purpose of the turbocharger in all of them is to provide a high pressure charge of a fluid or gas, typically air, to the combustion chamber of the engine. The turbocharger is typically driven by the exhaust of the engine, which is used to drive a rotatively-driven compressor that compresses the air or fluid that is introduced to the combustion chamber of the engine. As the pressure in the combustion chamber goes up, so does the pressure of the exhaust, creating a feedback loop that can create an overload condition for either the turbocharger or the engine.

To control the turbocharger so that it does not create an overload condition, a waste gate valve is typically employed in the exhaust circuit that diverts all or part of the exhaust gas away from the turbine drive of the compressor, so as to limit the pressure that the turbine of the turbocharger is subjected to. Thereby, the boost pressure that the turbocharger provides to the engine is limited at a maximum level to avoid damage to the engine or turbocharger.

In some turbocharger systems, two or more turbochargers are employed to operate under different conditions of the engine. A smaller, lower flow turbocharger will operate for lower engine speeds or lower load conditions of the engine, and a larger higher flow turbocharger will operate for higher engine speeds or more demanding conditions of the engine. These are known as turbocharger sequencing applications and may require several valves in the exhaust lines between the two turbochargers to direct exhaust to one or the other of the turbochargers, or to bypass one or both of them.

The valves that are used in turbocharger applications are subjected to extremely severe operating conditions, as they must operate over a large temperature range (typically −40° C.-800° C., sometimes up to 1000° C.), since the exhaust is extremely hot, and the exhaust contains corrosive and acidic materials. These valves, particularly valves in turbocharger sequencing applications, must have very low leakage characteristics so that exhaust gas does not escape to the engine compartment or elsewhere and, particularly for turbocharger sequencing applications, to improve the efficiency of the system. As a result of this requirement, most prior art turbocharger system exhaust valves have been poppet type valves, which traditionally leak less than butterfly valves.

Another consideration of these types of valves, in addition to maintaining low leakage through a wide temperature range, is maintaining low hysteresis through a wide temperature range. The valve is typically actuated by a pressure operated actuator and so the force that the valve exerts on the actuator at a given boost pressure should be the same whether the valve is being opened or being closed. That is, the relationship of the force required for a given opening of the valve should be the same, or as nearly the same as possible, whether the valve is being opened or being closed.

In addition, typically such valves are actuated in only one direction, either open or closed, and in the other direction are actuated by a spring. It is desirable to make the force of the spring as low as possible, while still ensuring complete actuation of the valve, for example, if the spring biases the valve closed, as is typical, then when biased closed the valve should be completely closed, and not excessively leak.

SUMMARY OF THE INVENTION

The invention provides a butterfly valve for controlling an exhaust gas stream in a turbocharger system. The butterfly valve has a housing with a valve passageway through which the exhaust gas stream passes from one end of the valve to the other. Bores on opposite sides of the passageway are aligned with each other along a shaft axis and lap seating surfaces are axially facing in the passageway on opposite sides of the bores and face opposite ends of the valve, such that the shaft axis is between the two lap seating surfaces, and the two lap seating surfaces are axially spaced from each other by the thickness of the butterfly valve element. The butterfly valve element is in the valve passageway between the two bores and between the two lap seating surfaces when closed. When fully open, the butterfly valve element is substantially perpendicularly directed relative to the lap seating surfaces.

The shaft extends between the bores and laterally through the butterfly valve element. Two bushings are provided, one bushing being received in a different one of the bores, and each bushing extending from the bore inwardly into a counter bore in the butterfly valve element. The shaft extends in each of the bushings so as to journal the shaft relative to the housing. There is a first slip fit between the bushing and the counter bore and a second slip fit between the shaft and the bushing. These are made as small as possible, permitted by manufacturing tolerances, but preferably one of these slip fits is smaller (i.e. more accurate) than the other. Placing a tight control on the fit at only one of these junctures helps enable controlling leakage through the valve to a very low level, for example less than 1% using production machining processes, and also provides production consistency, predictability of the performance of the valve, and reliable opening and closing at the temperature and pressure extremes. This permits using a lower spring force to return the valve to its normal position, typically the closed position.

The invention results in a low leakage butterfly valve for turbocharger exhaust applications. One way it does this is by permitting the butterfly element to move sufficiently in the passageway when it is closing against the opposed lap seat surfaces so that the butterfly valve element can attain a flat or parallel orientation relative to the lap seat surfaces. Doing so creates a seal all of the way around the overlapping surfaces. It also does this by allowing the fit at the tighter of the two interfaces to be tighter than what would otherwise normally be permitted, thereby reducing the leak path through that interface. In addition, this construction, when coupled with appropriate material selections, results in a butterfly valve with lower hysteresis throughout the entire temperature range.

The foregoing and other objects and advantages of the invention will be apparent in the detailed description and drawings which follow. In the description, reference is made to the accompanying drawings which illustrate a preferred embodiment of the invention.

DETAILED DESCRIPTION OF THE PREFERRED EMBODIMENT

Figure 1A:
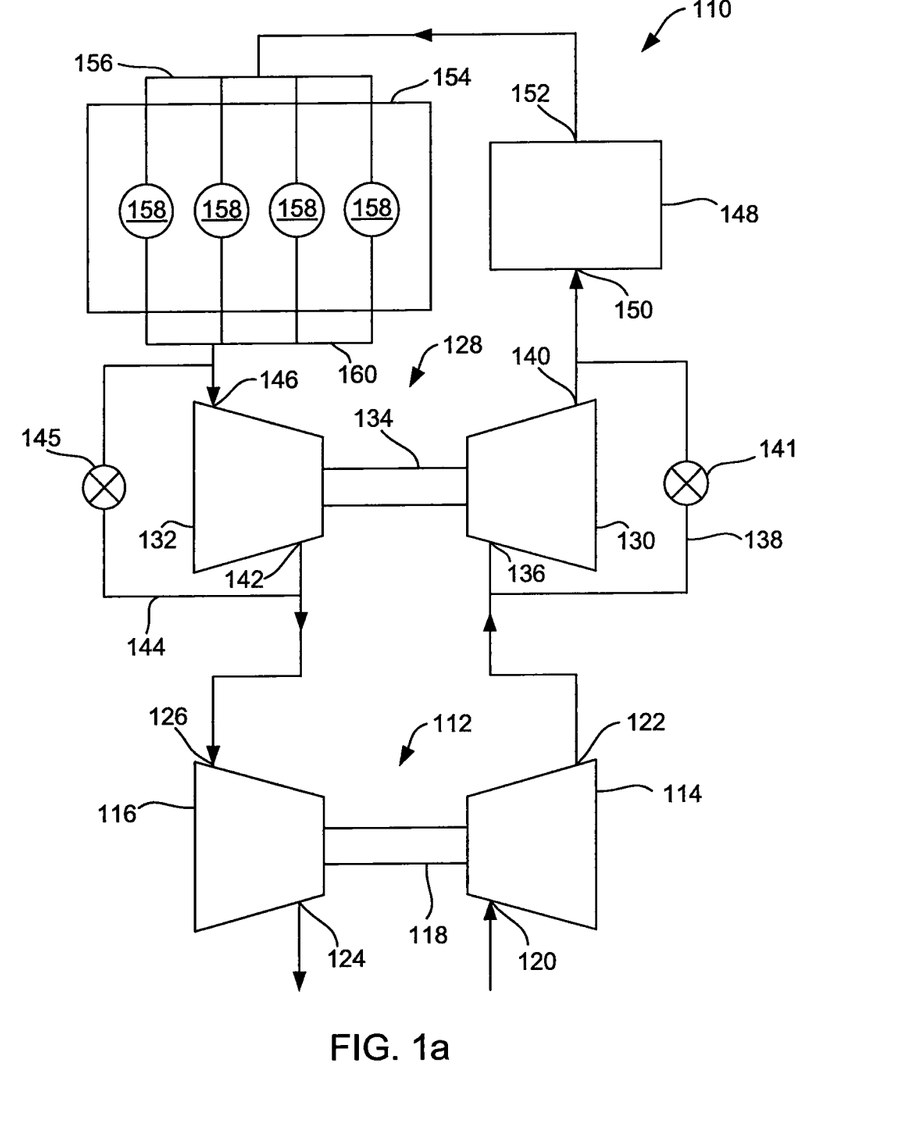
FIG. 1a is a schematic representation of a series sequential turbocharger system with butterfly valves according to the present invention.

FIG. 1a shows a schematic representation of a series sequential turbocharger system 110. The system includes a low pressure turbocharger 112 having a low pressure compressor 114 and a low pressure turbine 116. A shaft 118 rotatably connects the low pressure compressor 114 and the low pressure turbine 116. The low pressure compressor 114 includes an inlet 120 that preferably fluidly communicates with the air filter (not shown) of the vehicle. The low pressure compressor 114 also includes an outlet 122 that fluidly communicates with other components of the system 110, as described below. The low pressure turbine 116 includes an outlet 124 that preferably fluidly communicates with the exhaust line (not shown) of the vehicle. The low pressure turbine 116 also includes an inlet 126 that fluidly communicates with other components of the system 110, as described below.

The system 110 includes a high pressure turbocharger 128 having a high pressure compressor 130 and a high pressure turbine 132. A shaft 134 rotatably connects the high pressure compressor 130 and the high pressure turbine 132. The high pressure compressor 130 includes an inlet 136 that fluidly communicates with the outlet 122 of the low pressure compressor 114 and a compressor bypass conduit 138. The high pressure compressor 130 also includes an outlet 140 that fluidly communicates with the compressor bypass conduit 138. It should be noted that a compressor bypass valve 141 is located on the compressor bypass conduit 138 separating the ends connecting to the inlet 136 and the outlet 140 of the high pressure compressor 130. The compressor bypass valve 141 is preferably a butterfly valve according to the present invention. The high pressure turbine 132 includes an outlet 142 that fluidly communicates with the inlet 126 of the low pressure turbine 116 and a turbine bypass conduit 144. The high pressure turbine 132 also includes an inlet 146 that fluidly communicates with the turbine bypass conduit 144. It should be noted that a turbine bypass valve 145 is located on the turbine bypass conduit 144 separating the ends connecting to the inlet 146 and the outlet 142 of the high pressure turbine 132. The turbine bypass valve 145 is also preferably a butterfly valve according to the present invention.

The outlet 140 of the high pressure compressor 130 and the compressor bypass conduit 138 fluidly communicate with an inlet 150 of a charge air cooler 148. An outlet 152 of the charge air cooler 148 fluidly communicates with an intake manifold 156 of an engine block 154. The engine block 154 includes a plurality of combustion cylinders 158. Four combustion cylinders 158 are included in this system. However, those skilled in the art will recognize appropriate changes to apply the present invention to an engine with any number or configuration of combustion cylinders. The engine block 154 also includes an exhaust manifold 160 that fluidly communicates with the inlet 146 of the high pressure turbine 132 and the turbine bypass conduit 144.

Figure 1B:
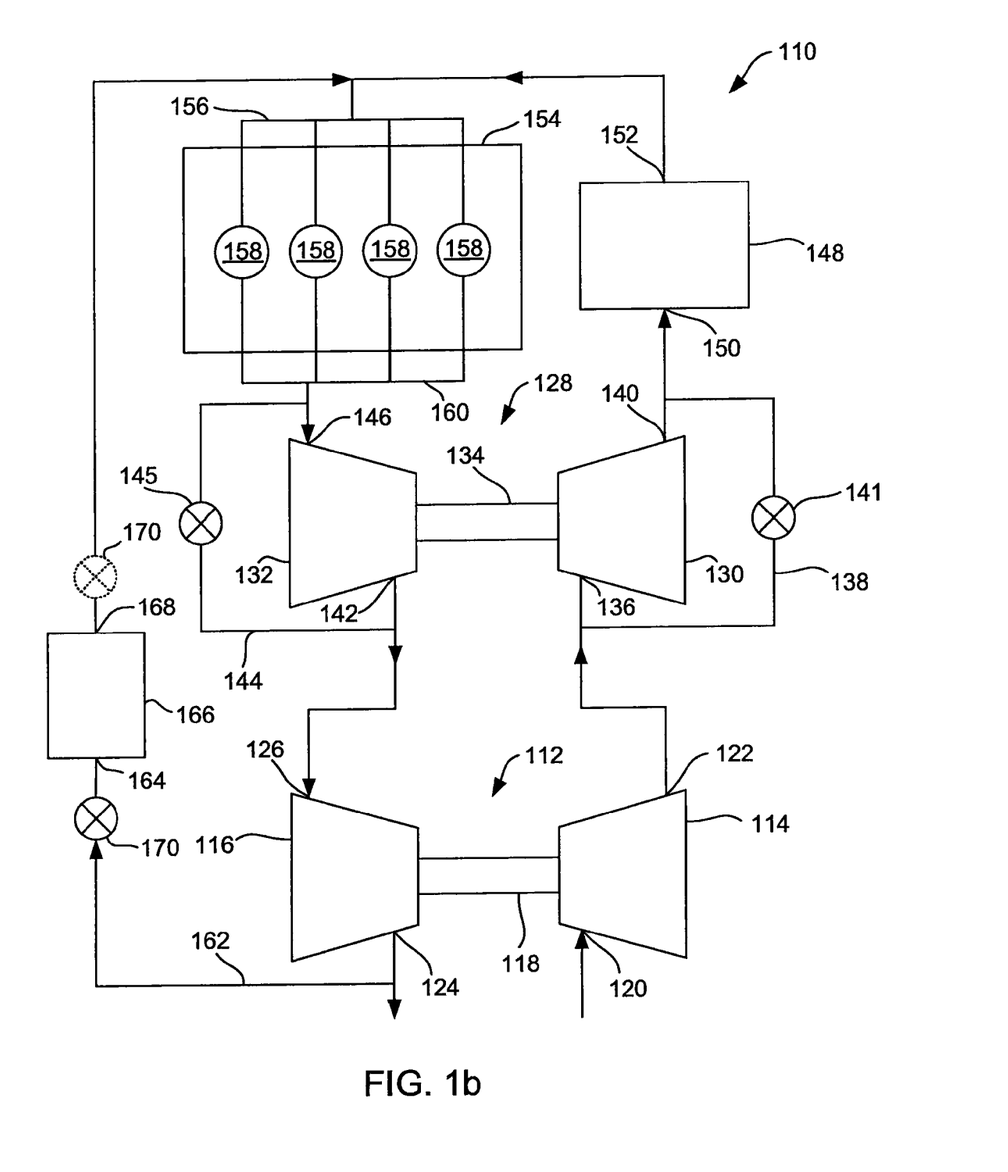
FIG. 1b is a schematic representation of the series sequential turbocharger system of FIG. 1a with an exhaust gas recirculation conduit.

It should be understood that the turbocharger system 110 shown in FIG. 1a is just one application to which a butterfly valve of the present invention could be applied. The application shown in FIG. 1a is a system to which the invention is particularly applicable, since very low leakage, low hysteresis valves are especially needed in such applications. However, a valve of the invention could be applied at different locations in a turbocharger system. For example, referring to FIG. 1b, the turbocharger system 110 may include an exhaust gas recirculation (EGR) conduit 162 with such a valve. Specifically, the intake manifold 156 and the outlet 124 of the low pressure turbine 116 fluidly communicate through an EGR conduit 162. The EGR conduit 162 fluidly communicates with an inlet 164 of a cooler 166 through an EGR valve 170, thereby providing a hot-side EGR valve. Alternatively, an outlet 168 of the cooler 166 may fluidly communicate with the intake manifold 156 through the EGR valve 170, thereby providing a cold-side EGR valve. The EGR valve 170 is preferably a butterfly valve as discussed below.

Figure 2:
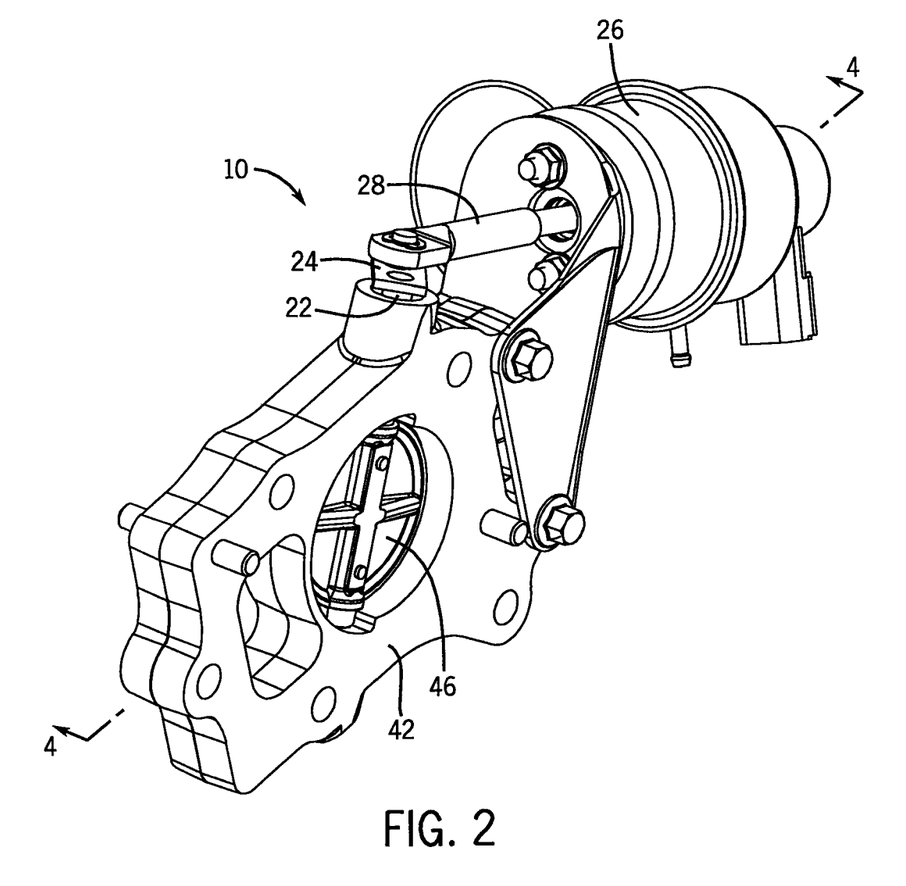
FIG. 2 is a perspective view of a butterfly valve according to the present invention.
Figure 3:
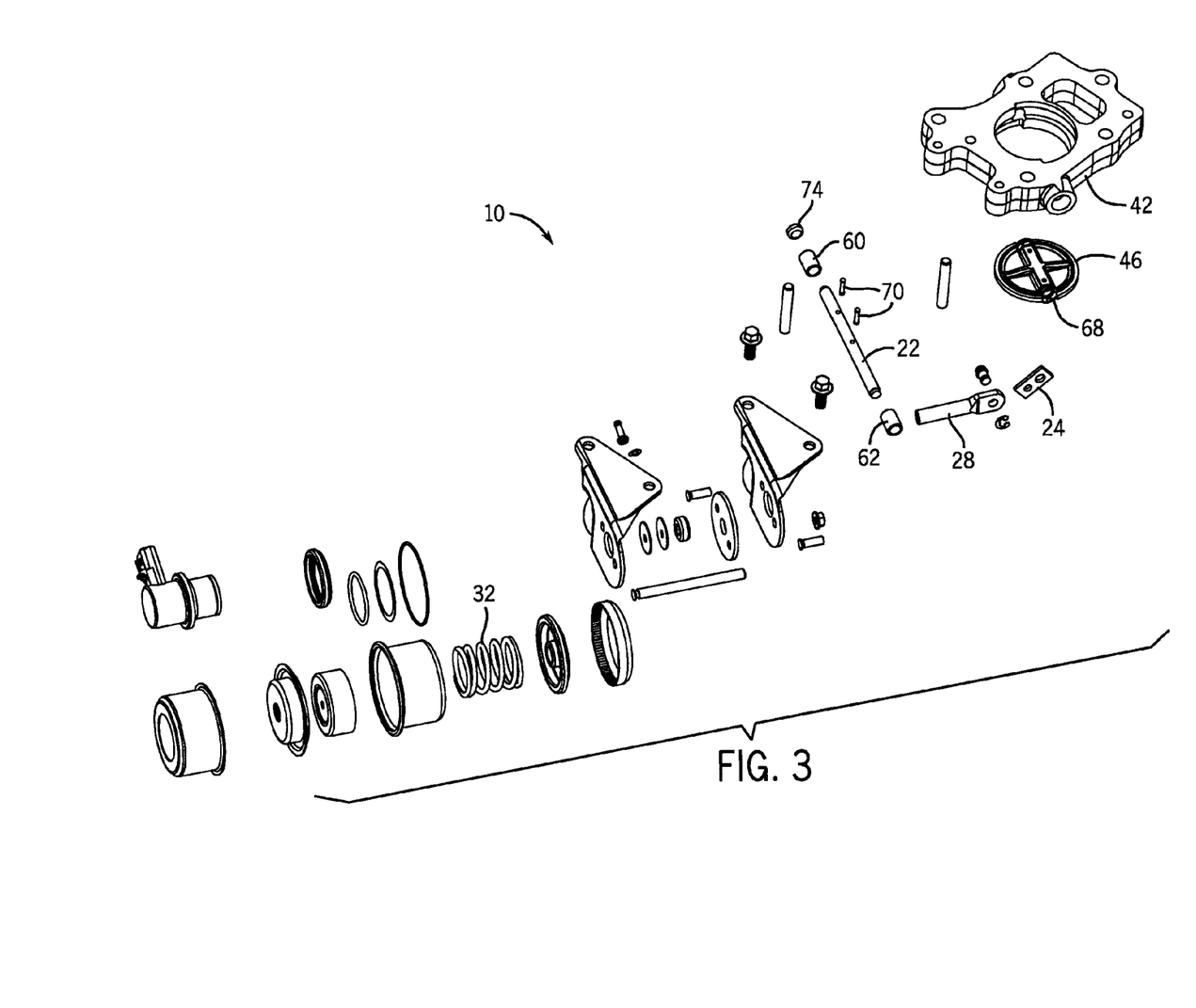
FIG. 3 is an exploded perspective view of the butterfly valve of FIG. 2.
Figure 4:
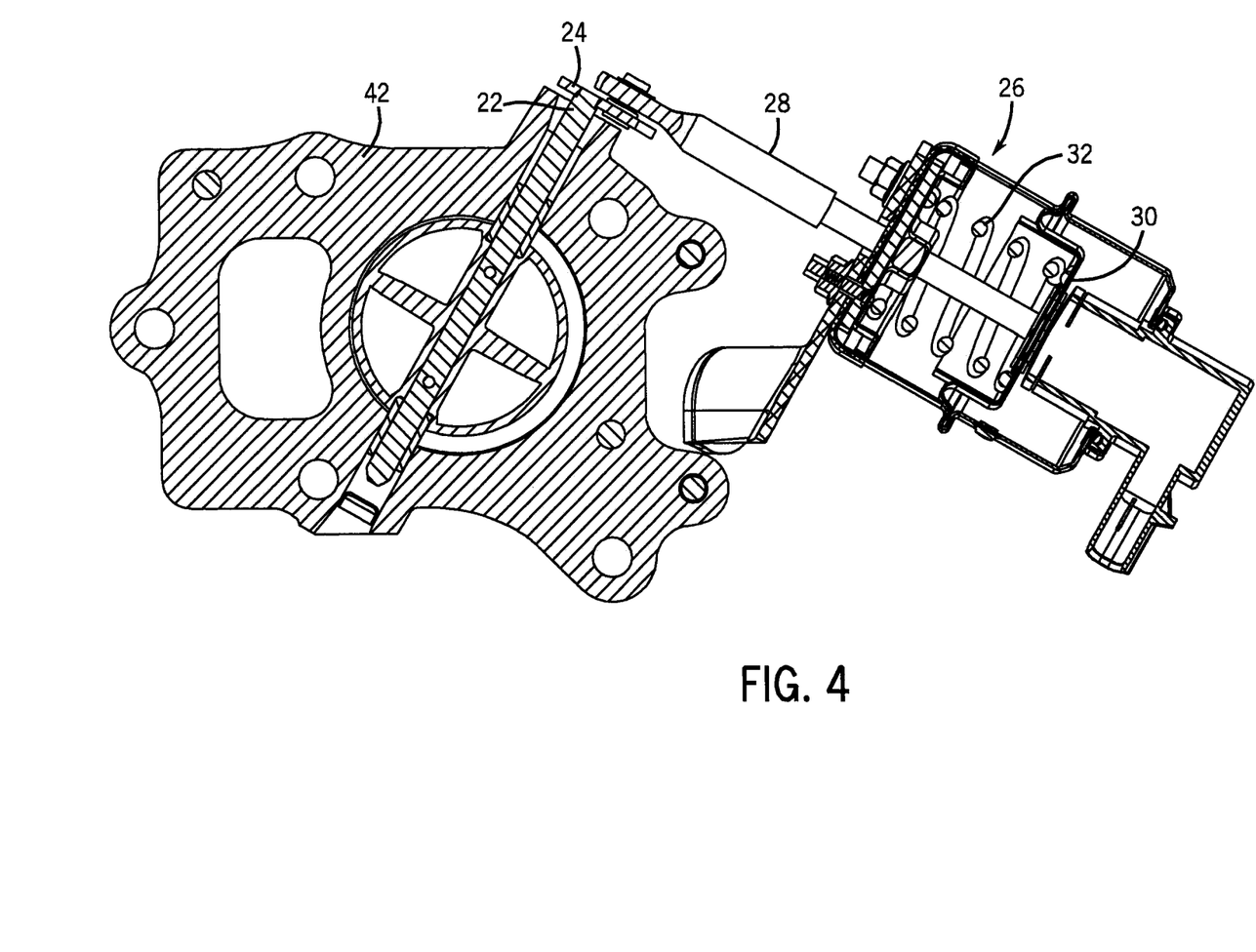
FIG. 4 is a sectional view from the plane of the line 4-4 of the butterfly valve of FIG. 2.

Referring to FIG. 2, a butterfly valve 10 incorporates a butterfly valve element 46 located within a housing 42. The physical design of the housing 42 may be modified depending on the location of the butterfly valve 10 within the turbocharger system 110. For example, the housing 42 may be designed to couple the inlet 136 and the outlet 140 of the high pressure compressor 130. The housing 42 may also be designed to couple the inlet 146 and the outlet 142 of the high pressure turbine 132. The housing 42 may be designed to couple other conduits if the butterfly valve 10 is located in a different position within the turbocharger system 110. The butterfly valve element 46 has a shaft 22 extending from the side thereof to which an arm 24 is affixed that acts as a lever arm for rotating the shaft 22, and the shaft 22 is affixed to the butterfly valve element 46 inside the butterfly valve 10 as described below. An actuator 26 is pressure operated to move rod 28 generally linearly along its axis so as to adjust the position of the butterfly valve according to the pressure exerted on the actuator 26. The actuator 26 is preferably a vacuum actuator including a diaphragm 30 and a biasing spring 32, as shown in FIGS. 3 and 4. Such actuators are well known in the art. Alternatively, a solenoid driven actuator or other type of actuator may be used instead of a pressure operated actuator.

Figure 5:
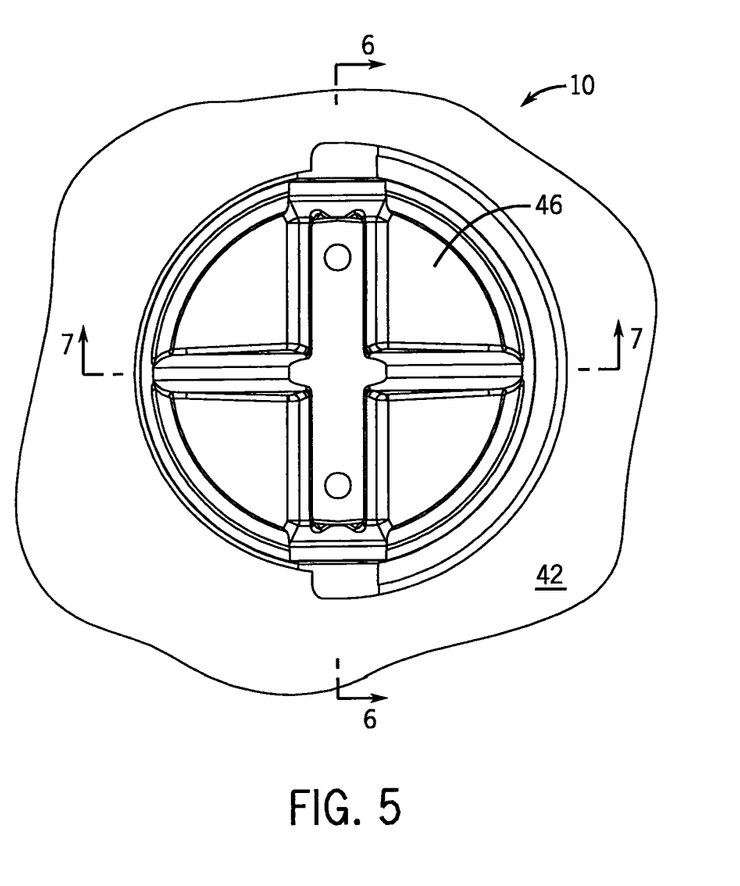
FIG. 5 is an end plan view of a butterfly valve of the type used in FIGS. 1a and 1b incorporating the invention.
Figure 6:
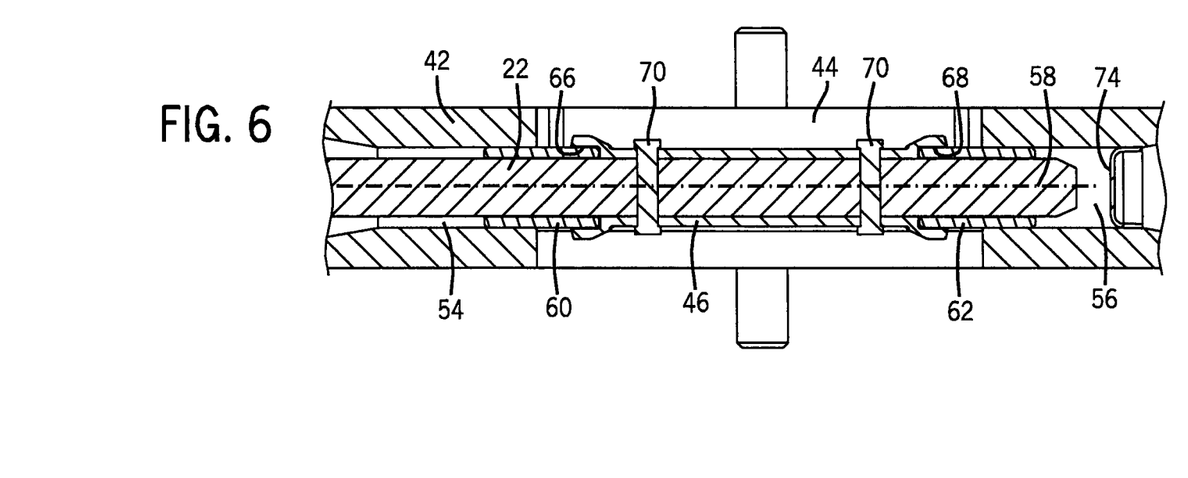
FIG. 6 is a cross-sectional view of the butterfly valve from the plane of the line 6-6 of FIG. 5.
Figure 7:
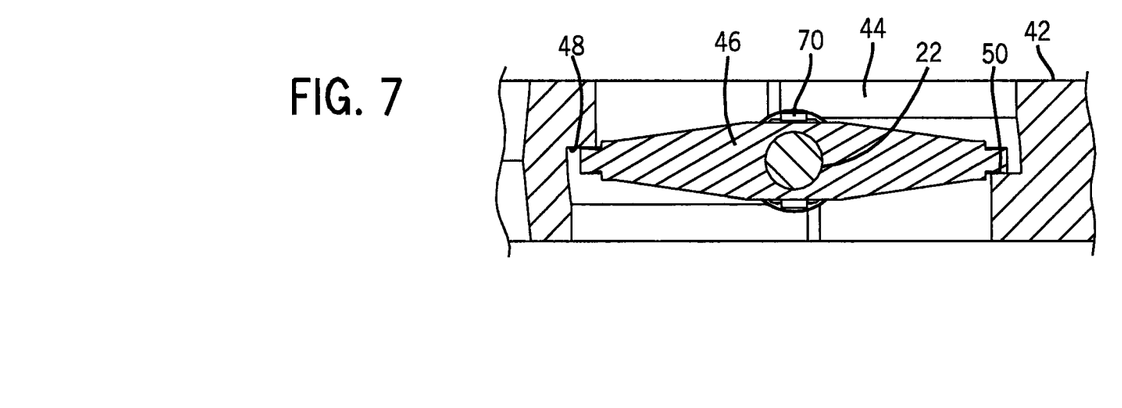
FIG. 7 is a cross-sectional view from the plane of the line 7-7 of FIG. 5.

Referring to FIGS. 5-7, the internal construction of a butterfly valve 10 according to the invention is illustrated. The compressor bypass valve 141, the turbine bypass valve 145, and the EGR valve 170 illustrated in FIGS. 1a and 1b could be constructed using the same principles as the butterfly valve 10, described below.

The butterfly valve 10 includes the housing 42 through which a valve passageway 44 extends from one end to the other. The butterfly valve element 46 that is positioned in the passageway 44 is generally circular and can be rotated about the axis 58 of shaft 22 so that it is either blocking the passageway 44, or allowing passage of gas through the passageway 44 in varying amounts. When it is fully open, the butterfly valve element is at oriented in a plane that is substantially perpendicular to the plane in which it lies in FIGS. 5-7, which is the closed position, so that when open substantially only its thickness dimension is presented to the flow of gas in the passageway. As such, the flow of gas can pass the butterfly valve element 46 on both sides of it and since the shaft is in the middle of the valve, the valve is generally balanced by the stream of gas. When the butterfly valve element is closed (FIGS. 5-7), it seats against lap seating surfaces 48 and 50 that are formed in the passageway on the housing on opposite sides of the passageway and facing opposite ends of the valve. The axis 58 about which the butterfly valve element 46 is turned is between the two lap seating surfaces 48 and 50, and is the axis of shaft 22.

Shaft 22 extends into bores 54 and 56 on opposite sides of the passageway 44, which are also aligned along the shaft axis 58. Bushings 60 and 62 are pressed into the respective bores 54 and 56 such that they do not turn relative to the housing 42 and are fixed along the axis 58 relative thereto. The bushings 60 and 62 journal the shaft 22 and also extend into butterfly counter bores 66 and 68 that are formed in opposite ends of the bore through the butterfly valve element 46 through which the shaft 22 extends. Pins 70 keep the butterfly valve element 46 from turning too much relative to the shaft 22, as they are pressed into holes in the shaft 22. The holes in the butterfly valve element 46 through which the pins 70 extend may be slightly larger than the pins 70 so they do not form a fixed connection with the butterfly valve element 46, so as to permit it some freedom of relative movement. Thus, the butterfly valve element 46 can, to a limited extent, turn slightly relative to the shaft 22, and move along the axis 58 relative to the shaft 22, limited by the pins 70 and the other fits described herein.

A cap 74 is preferably pressed into the bore 56, to close off that end of the assembly. The shaft 22 extends from the opposite end, out of bore 54, so that it can be coupled to an actuator, for example like the actuator 26. A seal pack (not shown) can be provided between the shaft 22 and the bore 54 to inhibit leakage into or out of the valve, and a backer ring (not shown) may be pressed into the bore 54 to hold in the seal pack. The lap seating surfaces 48 and 50 are actually spaced by approximately the thickness of the butterfly valve element and seal against the butterfly valve element on their respective sides of the axis 58. In order to form these seals, the butterfly valve element 46 must be free to lay flat against the lap seating surfaces in the closed position of the valve. That is nearly impossible to do unless there is sufficient clearance built into the rotary joints that mount the butterfly valve element. The problem is that too much tolerance results in a leaky valve.

There is one slip fit between the bushings 60, 62 and their respective counter bores 68, 66, and there is another slip fit between the shaft 22 and the bushings 60, 62. It has been found that the leakage through the valve passageway 44 can be best controlled by making one of these fits a close running fit, and the other of these fits a medium or loose running fit. It is somewhat preferable to make the bushing-to-counter bore fit a close fit and the shaft-to-bushing fit the looser fit because providing the looser fit at the smaller diameter results in less overall leakage. However, either possibility has been found acceptable. In addition, as shown in FIG. 6, the bushing-to-counter bore interface is preferably shorter than the shaft-to-bushing interface. Providing the bushing-to-counter bore interface as a close fit and a short interface reduces leakage and permits the butterfly valve element 46 to move to a limited extent relative to the bushings 60 and 62 and the shaft 22 so that the butterfly valve element 46 seats flatly against the housing 42.

Choice of materials has also been found important to reduce the hysteresis of the valve. In addition, sets of materials can be selected based on the temperature range of the application. For example, an operating temperature above 850° C. may correspond to one set of materials and an operating range between 850° C.-750° C. may correspond to another set of materials. It should also be recognized that similar materials may gall under high temperature and pressure. As such, the materials for the components of the butterfly valve 10 are preferably as follows: the housing 42 is cast steel or an HK30 austenitic stainless steel alloy, the butterfly valve element 46 is cast steel, the shaft 22 is stainless steel and the bushings 60 and 62 are a steel that is compatible with the operating temperature and coefficient of thermal expansion of the other materials. If the butterfly valve 10 is used as a turbine bypass valve 145, the shaft 22 and the butterfly valve element 46 may be stainless steel, the bushings 60 and 62 may be a cobalt/steel alloy, such as Tribaloy. Some applications may not require these materials or different combinations of these materials. For example, if the butterfly valve 10 is to be used in a low temperature application, the housing 42 may be high silicon molybdenum steel.

In an actual example, the fit of the bushings 60 and 62 to the counter bores 68 and 66 is that the OD of the bushings 60 and 62 is preferably 12.500 mm+0.000-0.011 mm and the ID of the counter bores 68 and 66 is preferably 12.507 mm+0.000-0.005 mm. These dimensions provide a maximum material condition of 0.002 mm. In the same application, the OD of the shaft is preferably in the range of 8.985 mm+0.000-0.015 mm and the ID of the bushing 60 and 62 is preferably in the range of 9.120 mm±0.015 mm. These dimensions provide a maximum material condition of 0.020 mm.

Use of the butterfly valve according to the present invention in a series sequential turbocharger system provides several advantages. For example, there is very little leakage when the butterfly valve is completely closed, allowing the turbocharger to operate with higher efficiency. In addition, the combination of materials for the butterfly valve, clearances, and tolerancing provide a very low hysteresis valve that operates smoothly regardless of temperature. That is, the valve operates at the same opening and closing forces throughout the range of temperatures in which it must operate. A butterfly valve is also better suited to this application than other types of valves. For example, a butterfly valve allows more gas flow relative to its size than a poppet valve. A butterfly valve also permits a higher level of control and modulation than prior art valves.

A preferred embodiment of the invention has been described in considerable detail. Many modifications and variations to the embodiment described will be apparent to those skilled in the art. Therefore, the invention should not be limited to the embodiment described, but should be defined by the claims which follow.

I claim:

1. A series sequential turbocharger system being coupled to an engine, the turbocharger system comprising:
   a low pressure turbocharger having a low pressure compressor and a low pressure turbine, the low pressure compressor being rotatably coupled to the low pressure turbine, and the low pressure compressor being in fluid communication with an intake manifold of the engine, and the low pressure turbine being in fluid communication with an exhaust manifold of the engine;

a high pressure turbocharger having a high pressure compressor and a high pressure turbine, the high pressure compressor being rotatably coupled to the high pressure turbine, the high pressure compressor being in fluid communication with the intake manifold of the engine, and the high pressure turbine being in fluid communication with the exhaust manifold of the engine;

a butterfly valve for controlling a gas stream in the turbocharger system, the butterfly valve having:
- a housing with a valve passageway through which the gas stream passes from a first end of the valve to a second end of the valve, the valve passageway including:
  - a shaft axis;
  - bores on opposite sides of the passageway, the bores being aligned along the shaft axis with one another;
  - lap seating surfaces on opposite sides of the passageway facing opposite ends of the valve, the shaft axis being between the lap seating surfaces;
- a butterfly valve element in the valve passageway between the bores, the butterfly valve element having counter bores;
- two bushings, each bushing being received in a different one of the bores and extending from the bore inwardly into a different one of the counter bores of the butterfly valve element;
- a shaft extending along the shaft axis and in each of the bushings so as to journal the shaft relative to the housing; and
- wherein there is a first slip fit creating a first rotary joint between the bushings and the counter bores and a second slip fit creating a second rotary joint between the shaft and the bushings, and one of the slip fits is closer than the other to insure the butterfly valve element seats flatly against the seating surfaces.

2. The turbocharger system of claim 1, wherein the first slip fit is a close running fit and the second slip fit is a looser fit than the first slip fit.

3. The turbocharger system of claim 2, wherein the first slip fit has a first interface length and the second slip fit has a second interface length, and wherein the first interface length is less than the second interface length.

4. The turbocharger system of claim 1, wherein the second slip fit is a close running fit and the first slip fit is a looser fit than the second slip fit.

5. The turbocharger system of claim 1, wherein a majority of the clearance provided by the slip fits is between the shaft and the bushings.

6. The turbocharger system of claim 1, wherein a majority of the clearance provided by the slip fits is between the bushings and the counter bores.

7. The turbocharger system of claim 1 wherein the housing and the butterfly valve element are cast steel, the shaft is stainless steel, and the bushings are steel.

8. The turbocharger system of claim 1, wherein the first end of the butterfly valve is in fluid communication with an inlet of the high pressure compressor and the second end of the butterfly valve is in fluid communication with an outlet of the high pressure compressor.

9. The turbocharger system of claim 1, wherein the first end of the butterfly valve is in fluid communication with an inlet of the high pressure turbine and the second end of the butterfly valve is in fluid communication with an outlet of the high pressure turbine.

10. The turbocharger system of claim 1, further comprising a plurality of butterfly valves.

11. A butterfly valve for controlling a gas stream of an internal combustion engine, comprising:
- a housing with a valve passageway through which the gas stream passes from one end of the valve to the other end of the valve, the valve passageway including:
  - a shaft axis;
  - bores on opposite sides of the passageway, the bores being aligned along the shaft axis with one another;
  - lap seating surfaces on opposite sides of the passageway facing opposite ends of the valve, the shaft axis being between the lap seating surfaces;
- a butterfly valve element in the valve passageway between the bores, the butterfly valve element having counter bores on opposite sides of the butterfly valve element aligned along the shaft axis;
- two bushings, each bushing being received in a different one of the bores and extending from the bore inwardly into a different one of the counter bores of the butterfly valve element;
- a shaft extending along the shaft axis and in each of the bushings so as to journal the shaft relative to the housing; and
  - wherein there is a first slip fit creating a first rotary joint between the bushings and the counter bores and a second slip fit creating a second rotary joint between the shaft and the bushings, and one of the slip fits is closer than the other to insure the butterfly valve element seats flatly against the lap seating surfaces.

12. The butterfly valve of claim 11, wherein the first slip fit is a close running fit and the second slip fit is a looser fit than the first slip fit.

13. The butterfly valve of claim 11, wherein the first slip fit has a first interface length and the second slip fit has a second interface length, and wherein the first interface length is less than the second interface length.

14. The butterfly valve of claim 11, wherein the second slip fit is a close running fit and the first slip fit is a looser fit than the second slip fit.

15. The butterfly valve of claim 11, wherein a majority of the clearance provided by the slip fits is between the shaft and the bushings.

16. The butterfly valve of claim 11, wherein a majority of the clearance provided by the slip fits is between the bushings and the counter bores.

17. The butterfly valve of claim 11, wherein the housing and the butterfly valve element are cast steel, the shaft is stainless steel, and the bushings are steel.

* * * * *